United States Patent
Hoshi

(10) Patent No.: US 11,460,716 B2
(45) Date of Patent: Oct. 4, 2022

(54) SPECTACLE LENS PRODUCTION METHOD AND SPECTACLE LENS

(71) Applicant: HOYA LENS THAILAND LTD., Pathumthani (TH)

(72) Inventor: Yuji Hoshi, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 147 days.

(21) Appl. No.: 16/650,600

(22) PCT Filed: Dec. 18, 2018

(86) PCT No.: PCT/JP2018/046520
§ 371 (c)(1),
(2) Date: Mar. 25, 2020

(87) PCT Pub. No.: WO2019/124352
PCT Pub. Date: Jun. 27, 2019

(65) Prior Publication Data
US 2020/0326559 A1    Oct. 15, 2020

(30) Foreign Application Priority Data

Dec. 19, 2017 (JP) ............... JP2017-242804
Dec. 19, 2017 (JP) ............... JP2017-242805

(51) Int. Cl.
*G02C 7/02* (2006.01)
*B29D 11/00* (2006.01)
(Continued)

(52) U.S. Cl.
CPC .............. *G02C 7/024* (2013.01); *B29C 33/14* (2013.01); *B29D 11/0048* (2013.01);
(Continued)

(58) Field of Classification Search
CPC .... G02C 7/024; G02C 7/021; G02C 2202/24; G02C 7/022; G02C 7/06; G02C 7/068;
(Continued)

(56) References Cited

U.S. PATENT DOCUMENTS 11,000,976 B2    5/2021   Fäcke et al.
2007/0238804 A1* 10/2007  Ho .................... A61K 6/20
                                              522/77

(Continued)

FOREIGN PATENT DOCUMENTS

CN    104678572 A    6/2015
CN    110226118 A    9/2019
(Continued)

OTHER PUBLICATIONS

CN201880082734, "First Office Action", with machine translation, dated Mar. 30, 2021, 14 pages.
(Continued)

*Primary Examiner* — Jordan M Schwartz
(74) *Attorney, Agent, or Firm* — Kilpatrick Townsend & Stockton LLP

(57) ABSTRACT

A method for producing a spectacle lens 2 including a base portion 2 that is made of a resin material and includes a convex object-side face and a concave eyeball-side face, and an optical element 12 that is made of a material different from the material for forming the base portion and is embedded in the base portion, is described. The method includes: arranging an optical element in a cavity 28 of a mold including a first mold part 20 and a second mold part 24 that can be opened and closed; introducing a resin material for forming a base portion of the spectacle lens into the cavity of the mold; obtaining the spectacle lens by curing
(Continued)

the resin material that is a resin for forming the base portion; disassembling the mold; and detaching the spectacle lens from the mold.

11 Claims, 9 Drawing Sheets

(51) Int. Cl.
   *B29C 33/14* (2006.01)
   *G02B 5/18* (2006.01)
(52) U.S. Cl.
   CPC ........ *B29D 11/00326* (2013.01); *G02C 7/021* (2013.01); *G02C 7/022* (2013.01); *G02B 5/1814* (2013.01)
(58) Field of Classification Search
   CPC ........ B29D 11/00009; B29D 11/00019; B29D 11/00028; B29D 11/00317; B29D 11/00326; B29D 11/00336; B29D 11/00355; B29D 11/00413; B29C 33/424
   See application file for complete search history.

(56) References Cited

U.S. PATENT DOCUMENTS

| | | |
|---|---|---|
| 2015/0160477 A1 | 6/2015 | Dai |
| 2016/0306192 A1 | 10/2016 | Marshall et al. |
| 2017/0068095 A1 | 3/2017 | Holland et al. |
| 2017/0131567 A1* | 5/2017 | To ........................ G02C 7/022 |
| 2017/0184875 A1 | 6/2017 | Newman |
| 2017/0269380 A1* | 9/2017 | Liao ................... G02B 5/0268 |
| 2018/0252850 A1 | 9/2018 | Aoki |
| 2019/0025930 A1* | 1/2019 | Fransson ............ G02B 27/4205 |
| 2019/0033619 A1 | 1/2019 | Neitz et al. |
| 2020/0012123 A1 | 1/2020 | Newman |
| 2020/0073147 A1 | 3/2020 | Bakaraju |
| 2020/0241325 A1* | 7/2020 | Chalberg ............... G02C 7/049 |
| 2021/0356763 A1* | 11/2021 | Le Saux ............... B33Y 10/00 |

FOREIGN PATENT DOCUMENTS

| | | |
|---|---|---|
| WO | 2015/147758 A1 | 10/2015 |
| WO | 2016113288 A1 | 7/2016 |
| WO | 2017/030207 A1 | 2/2017 |
| WO | 2017030207 A1 | 8/2017 |
| WO | 2018/026697 A1 | 2/2018 |
| WO | 2018/076057 A1 | 5/2018 |

OTHER PUBLICATIONS

PCT/JP2018/046520, English translation of International Search Report dated Mar. 26, 2019, 5 pages.
EP18890962.6, "Extended European Search Report", dated Jan. 5, 2022, 13 pages.

* cited by examiner

SPECTACLE LENS PRODUCTION METHOD AND SPECTACLE LENS

CROSS-REFERENCE TO RELATED APPLICATIONS

This application is a National Stage of International Application No. PCT/JP2018/046520, filed Dec. 18, 2018, which claims priority to Japanese Patent Application No. 2017-242804, filed Dec. 19, 2017, and to Japanese Patent Application No. 2017-242805, Dec. 19, 2017, and the contents of which are incorporated by reference in their entirety.

TECHNICAL FIELD

The present disclosure generally relates to a spectacle lens production method and a spectacle lens, and particularly relates to a spectacle lens production method and a spectacle lens in which an optical element is embedded.

BACKGROUND ART

In order to impart various additional functions to spectacle lenses, spectacle lenses in which an optical element is embedded inside the lenses have been proposed.

For example, in order to suppress the progress of refractive errors such as short-sightedness, a plastic spectacle lens is proposed in which, for example, a large number of hemispherical (plano-convex) small beads (optical elements) each with a diameter of approximately 1 mm are arranged at predetermined positions of the spectacle lens has been proposed (Patent Document 1). Patent Document 1 proposes a configuration in which a large number of small beads are embedded in a spectacle lens, in addition to the configuration in which a large number of small beads are arranged on the convex face of a spectacle lens.

Moreover, Patent Document 2 proposes a spectacle lens (optical device) in which a light-guiding member (diffraction grating) as an optical element is embedded inside the lens without being exposed to the outside thereof, for use as a spectacle lens for a wearable terminal.

CITATION LIST

Patent Documents

Patent Document 1: U.S. Patent Application Publication No. 2017/131567
Patent Document 2: WO 2017/030207

SUMMARY OF DISCLOSURE

Technical Problem

When mass-producing spectacle lenses in which a large number of small beads that are optical elements are arranged on the convex face, a production method is employed in which a lens material is poured or injected into a mold having a large number of minute concave portions formed on one molding face. However, this production method cannot be used for spectacle lenses in which a large number of small beads are embedded in the spectacle lenses. Thus, such spectacle lenses are problematic in that the mass production thereof is not easy.

Furthermore, the spectacle lens as proposed in Patent Document 2 in which an optical element is embedded inside the lens without being exposed to the outside thereof is also problematic in that, since the optical element cannot be arranged with ease at a predetermined position inside the spectacle lens, the mass production thereof is difficult.

The present disclosure was made in view of the above-described problems, and it is an aspect thereof to provide a spectacle lens production method with which it is possible to easily mass-produce spectacle lenses in which an optical element is embedded.

It is another aspect of the present disclosure to provide a spectacle lens produced using this spectacle lens production method.

Also, it is another aspect of the present disclosure to provide a spectacle lens produced using this spectacle lens production method.

Solution to Problem

The present disclosure is directed to a method for producing a spectacle lens including a base portion that is made of a resin material and includes a convex object-side face and a concave eyeball-side face, and an optical element that is made of a material different from the material for forming the base portion and is embedded in the base portion, including:

a step of arranging an optical element in a cavity of a mold including a first mold part and a second mold part that can be opened and closed;

a step of introducing a resin material for forming a base portion of the spectacle lens into the cavity of the mold;

a step of obtaining the spectacle lens by curing the resin material that is a resin for forming the base portion;

a step of disassembling the mold; and a step of detaching the spectacle lens from the mold.

With this configuration, it is possible to easily mass-produce spectacle lenses in which an optical element is embedded.

According to another preferred aspect of the present disclosure, the optical element is a plurality of small beads that are made of a resin different from the resin for forming the base portion, and that are embedded in the base portion in a state of being partially exposed from the base portion, and the step of arranging an optical element includes
a step of arranging a resin material that is a resin for forming the small beads at predetermined positions on a surface of the first mold part of the mold, and
a step of curing the resin material that is a resin for forming the small beads.

With this configuration, when a resin material that is a resin for forming a base portion is introduced into the cavity of the mold, the small beads cured at predetermined positions on a surface of the first mold part of the mold are taken into the resin material for forming the base portion. Thus, it is possible to produce a spectacle lens in which small beads are embedded in the base portion, without performing special processing or the like on the mold.

According to another preferred aspect of the present disclosure, each of the small beads has a refractive power larger than that of the base portion.

According to another preferred aspect of the present disclosure, the small beads each have a diameter r of 0.8 to 2.0 mm.

According to another preferred aspect of the present disclosure, the small beads are made of a thiourethane material.

According to another preferred aspect of the present disclosure, the refractive power of the small beads is larger than the refractive power of the base portion by 2.00 to 5.00 diopters.

According to another preferred aspect of the present disclosure, intervals between adjacent small beads are each set to a distance that is equal to a radius (r/2) of the small beads.

According to another preferred aspect of the present disclosure, the step of arranging an optical element includes
a step of arranging a support for the optical element, at a predetermined position on a surface of the first mold part of the mold, and
a step of placing the optical element on the support.

With this configuration, an optical element can be arranged at a predetermined position in the cavity through simple processing that places the optical element on a support arranged on a surface of the first mold part. Thus, it is possible to easily produce a resin spectacle lens in which an optical element is arranged at a predetermined position in the spectacle lens.

According to another preferred aspect of the present disclosure, the support is made of the same resin as the resin for forming the spectacle lens, and
after the step of placing the optical element on the support, a step of curing the resin for forming the support is performed.

According to another preferred aspect of the present disclosure, the optical element is a strip-like light-guiding element.

According to another preferred aspect of the present disclosure, the base portion has a refractive power that corrects short-sightedness.

Furthermore, another aspect of the present disclosure is directed to a spectacle lens including:
a base portion that is made of a resin material; and
a plurality of small beads that are made of a resin different from the resin for forming the base portion, and that are completely embedded inside the base portion.

According to another preferred aspect of the present disclosure, the base portion has a refractive power that corrects short-sightedness, and
each of the small beads has a refractive power larger than that of the base portion.

According to another preferred aspect of the present disclosure, the refractive power of the small beads is larger than the refractive power of the base portion by 2.00 to 5.00 diopters.

According to another preferred aspect of the present disclosure, the small beads each have a diameter r of 0.8 to 2.0 mm.

According to another preferred aspect of the present disclosure, intervals between adjacent small beads are each set to a distance that is equal to a radius (r/2) of the small beads.

Advantageous Effects of Disclosure

According to the present disclosure, it is possible to provide a spectacle lens production method with which it is possible to easily mass-produce spectacle lenses in which an optical element is embedded.

Furthermore, it is also possible to provide a spectacle lens produced using this spectacle lens production method.

DESCRIPTION OF EMBODIMENT

Figure 1:
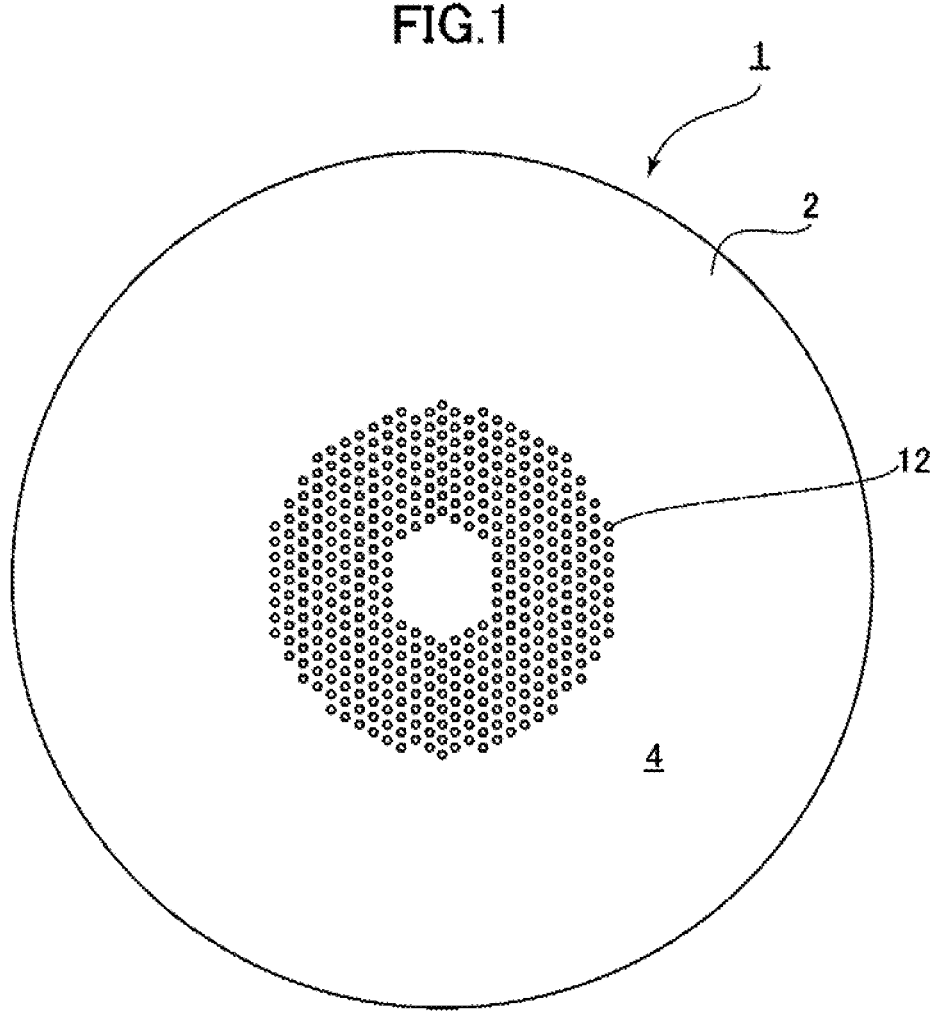
FIG. 1 is a schematic plan view of a spectacle lens produced using a spectacle lens production method according to an embodiment of the present disclosure.

Hereinafter, a spectacle lens production method according to a first embodiment of the present disclosure will be described in detail with reference to the drawings. FIG. 1 is a schematic plan view of a spectacle lens 1 produced using a spectacle lens production method according to a first embodiment of the present disclosure, and FIG. 2 is a schematic cross-sectional view of the spectacle lens 1.

Figure 2:
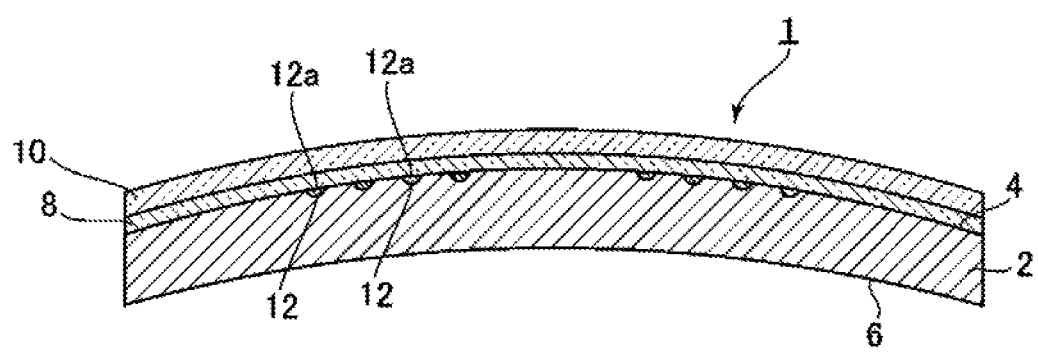
FIG. 2 is a schematic cross-sectional view of the spectacle lens produced using the spectacle lens production method according to the embodiment of the present disclosure.
Figure 3:
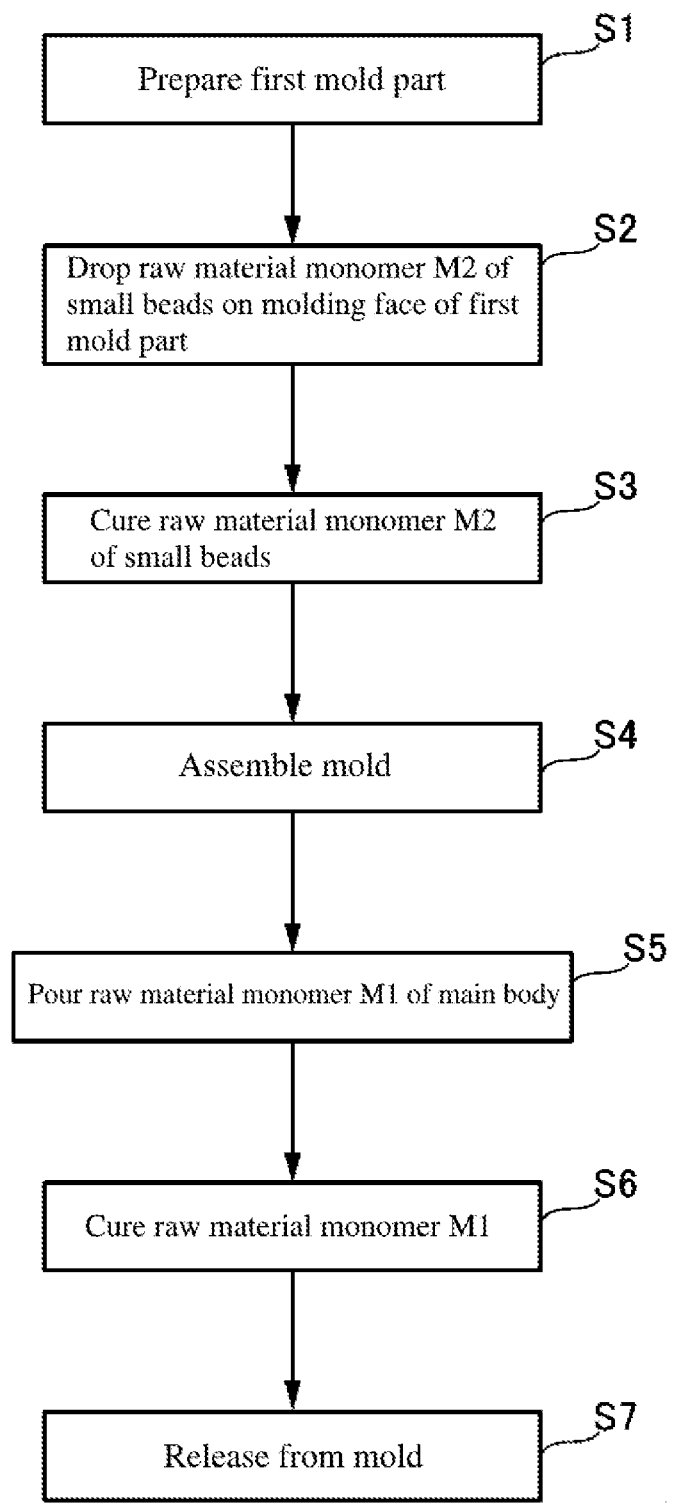
FIG. 3 is a flowchart illustrating steps of the spectacle lens production method according to the embodiment of the present disclosure.

As shown in FIGS. 1 and 2, the spectacle lens 1 includes a spectacle lens main body (base portion) 2. The spectacle lens main body (base portion) 2 includes a convex object-side face (outer face) 4 and a concave eyeball-side face (inner face) 6. Moreover, in this embodiment, a hard coat layer 8 and an anti-reflection coating (AR coating) 10 are provided on the object-side face 4.

On the object-side face 4 side of the spectacle lens main body 2, a large number of hemispherical small beads (optical elements) 12 are embedded in the spectacle lens main body 2. As shown in FIG. 1, the small beads 12 are regularly arranged in a ring-like region at the center of the spectacle lens main body 2 in a plan view. Moreover, as shown in FIG. 1, when viewed in a cross-section, part of each small bead 12, specifically, a flat portion 12a is flush with the convex object-side face 4 of the spectacle lens main body 2 and is exposed to the outside.

Also as described in Patent Document 1 above, it is known that the use of spectacle lenses in which a large number of small beads are embedded can suppress the progress of refractive errors such as short-sightedness of a person who is wearing the glasses. The principle thereof, which will be described later in detail, is that small beads having a refractive power larger than that of the base portion of the spectacle lens for correcting short-sightedness form images also in front of the retina, and suppress the progress of short-sightedness. It is preferable that the refractive power of the small beads is larger than the refractive power of the base portion of the spectacle lens by 2.00 to 5.00 diopters.

In this embodiment, the spectacle lens main body 2 is made of, for example, a thiourethane-based resin (thermosetting resin) with a refractive index of approximately 1.590 or 1.578. Furthermore, the small beads 12 are made of, for example, a thiourethane-based resin (thermosetting resin) with a refractive index of approximately 1.5955 and having excellent adhesion to the resin for forming the spectacle lens main body 2. The resin for forming the spectacle lens main body 2 and the resin for forming the small beads 12 may also be other types of thermosetting resins selected as appropriate in consideration of refractive indices.

Furthermore, in this embodiment, the hemispherical small beads 12 are set to each have a diameter r of approximately 0.8 to 2.0 mm and a thickness of approximately 0.1 to 1.15 mm. Furthermore, it is preferable that the intervals between the small beads 12 are each set to be approximately equal to the radius (r/2) of the small beads 12.

Next, a production method of the spectacle lens 1 will be described.

Figure 4:
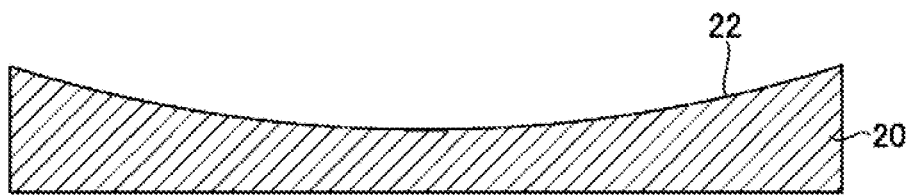
FIG. 4 is a schematic view illustrating the spectacle lens production method shown in FIG. 3.

First, a first mold part 20 that is used to produce the spectacle lens 1 is prepared (S1). The first mold part 20 is made of a material such as glass as in the case of known mold parts that are used to produce plastic spectacle lenses, and includes a concave molding face 22 for molding the convex object-side face 4 of the spectacle lens 1 as shown in FIG. 4.

Figure 5:
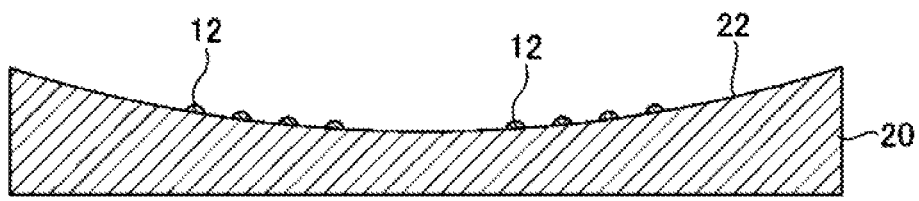
FIG. 5 is a schematic view illustrating the spectacle lens production method shown in FIG. 3.

Next, as shown in FIG. 5, a predetermined amount of resin material (a raw material monomer M2) that is a resin for forming the small beads 12 is arranged (dropped) using a dispenser, at each predetermined position on the concave molding face 22 of the first mold part 20 (S2). Each droplet of raw material monomer M2 has a substantially hemispherical (plano-convex lens) shape on the molding face 22 due to surface tension or the like. The viscosity, amount, and the like of the raw material monomer M2 arranged on the molding face 22 are set such that the arranged raw material monomer M2 is cured to form small beads 12 with a desired size and shape.

Next, the hemispherical raw material monomer M2 dropped on the molding face 22 is cured (S3). According to the production method of this embodiment, the dropped raw material monomer M2 is cured by being left at room temperature for a predetermined period of time. However, the raw material monomer M2 may be cured with heat or the like according to the type of raw material monomer, the treatment environment, or the like.

Figure 6:
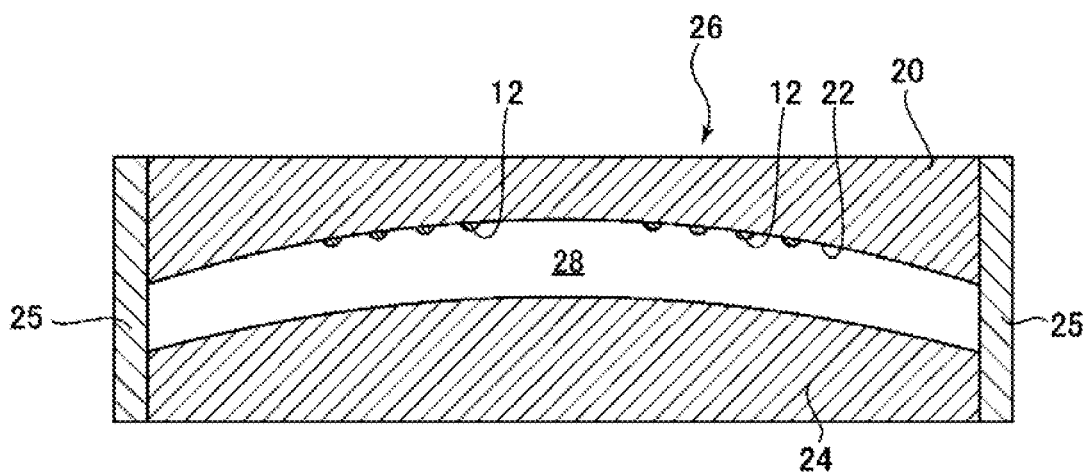
FIG. 6 is a schematic view illustrating the spectacle lens production method shown in FIG. 3.

Moreover, as shown in FIG. 6, the first mold part 20 in which the raw material monomer M2 dropped on predetermined positions on the molding face 22 has been cured is combined with other mold parts 24, 25, and the like, so that a mold 26 is assembled, and a cavity 28 inside the mold 26 is closed (S4). At this time, the molding face 22 of the first mold part 20 constitutes part of the cavity 28 (FIG. 6).

Figure 7:
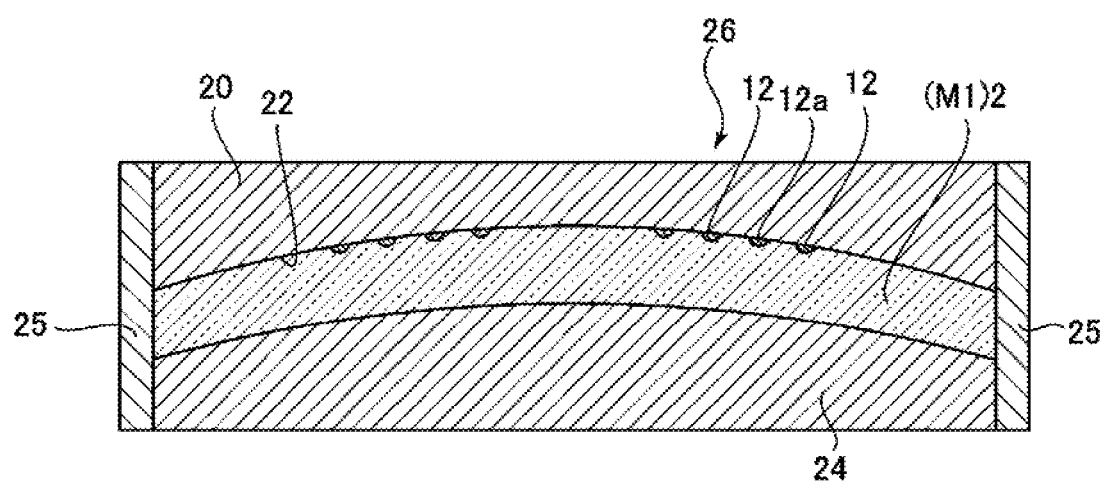
FIG. 7 is a schematic view illustrating the spectacle lens production method shown in FIG. 3.
Figure 8:
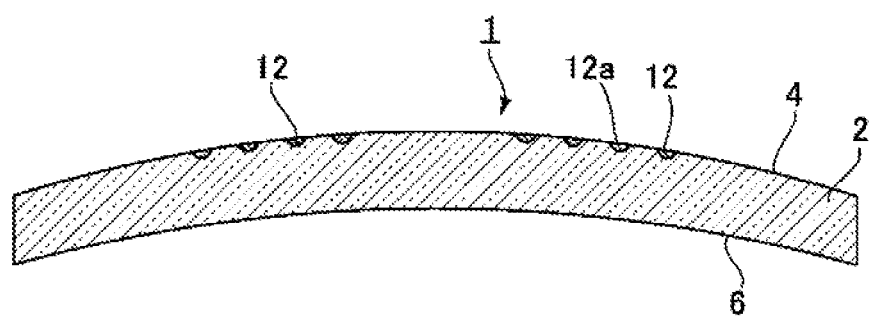
FIG. 8 is a schematic view illustrating the spectacle lens production method shown in FIG. 3.

Next, as shown in FIG. 7, a raw material monomer (resin material) M1 for forming the spectacle lens main body 2 is poured, that is, introduced into the cavity 28 (S5). At this time, the raw material monomer M2 for forming the small beads 12 has been cured at predetermined positions on the molding face 22 of the first mold part 20 and has formed the small beads 12, and thus the small beads 12 are taken into the raw material monomer M1 introduced into the cavity 28 and forming the spectacle lens main body 2.

Moreover, the raw material monomer (resin material) M1 introduced into the cavity 28 and forming the spectacle lens main body 2 is cured in the cavity 28 through heating to a predetermined temperature (S6). As a result, a spectacle lens in which the small beads 12 are embedded in the spectacle lens main body 2 is formed inside the cavity 28. The faces of the small beads 12 that are in contact with the molding face 22 are flush with the object-side face 4 of the spectacle lens main body 2 that is in contact with the molding face 22, and the small beads 12 are exposed to the outside from the spectacle lens main body 2 at these portions (flat portions 22a).

Lastly, the mold 26 is disassembled, and the spectacle lens 1 molded inside the cavity 28 is detached, that is, released from the mold 26 (S7).

Subsequently, the hard coat layer 8 and the anti-reflection coating 10 are formed on a convex face 3 of the spectacle lens main body 2, so that the spectacle lens 1 is finally completed.

In the foregoing first embodiment, thermosetting resins were used as the resins for forming the spectacle lens main body and the small beads, but a configuration may also be employed in which thermoplastic resins commonly used for spectacle lenses are used instead of the thermosetting resins.

Furthermore, in the foregoing first embodiment, the first mold part 20 includes the concave molding face 22 for molding the convex object-side face 4 of the spectacle lens 1, and the convex object-side face 4 of the spectacle lens is molded by the concave molding face 22, but a configuration may also be employed in which a first mold part includes a convex molding face for molding a concave eyeball-side face of a spectacle lens, and the concave eyeball-side face of the spectacle lens is molded by the convex molding face.

Next, a spectacle lens production method according to a second embodiment of the present disclosure will be described in detail.

Figure 9:
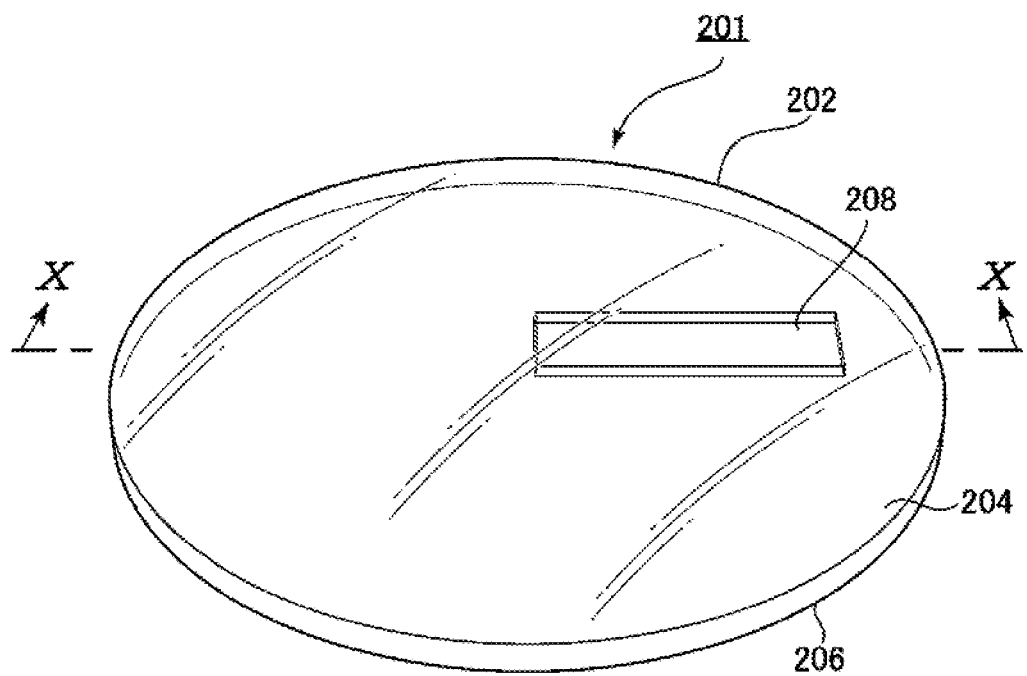
FIG. 9 is a schematic perspective view of a spectacle lens produced using a spectacle lens production method according to a second embodiment of the present disclosure.

First, the configuration of a spectacle lens produced using the spectacle lens production method according to the second embodiment of the present disclosure will be described. FIG. 9 is a schematic perspective view of a spectacle lens 1 produced using the spectacle lens production method according to the second embodiment of the present disclosure, and FIG. 10 is a cross-sectional view taken along the line X-X in FIG. 9.

Figure 10:
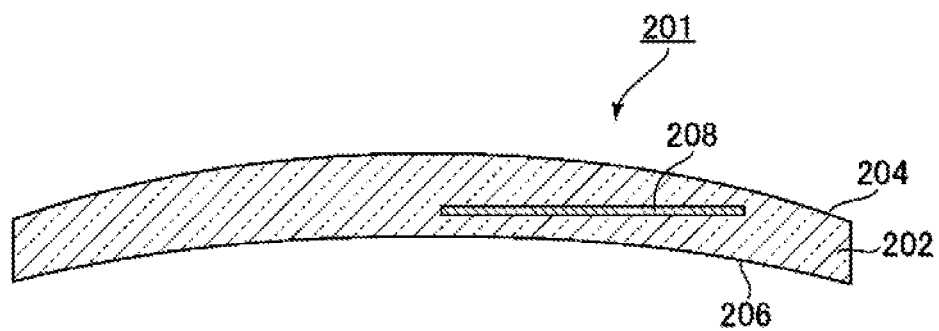
FIG. 10 is a cross-sectional view taken along the line X-X in FIG. 1.
Figure 11:
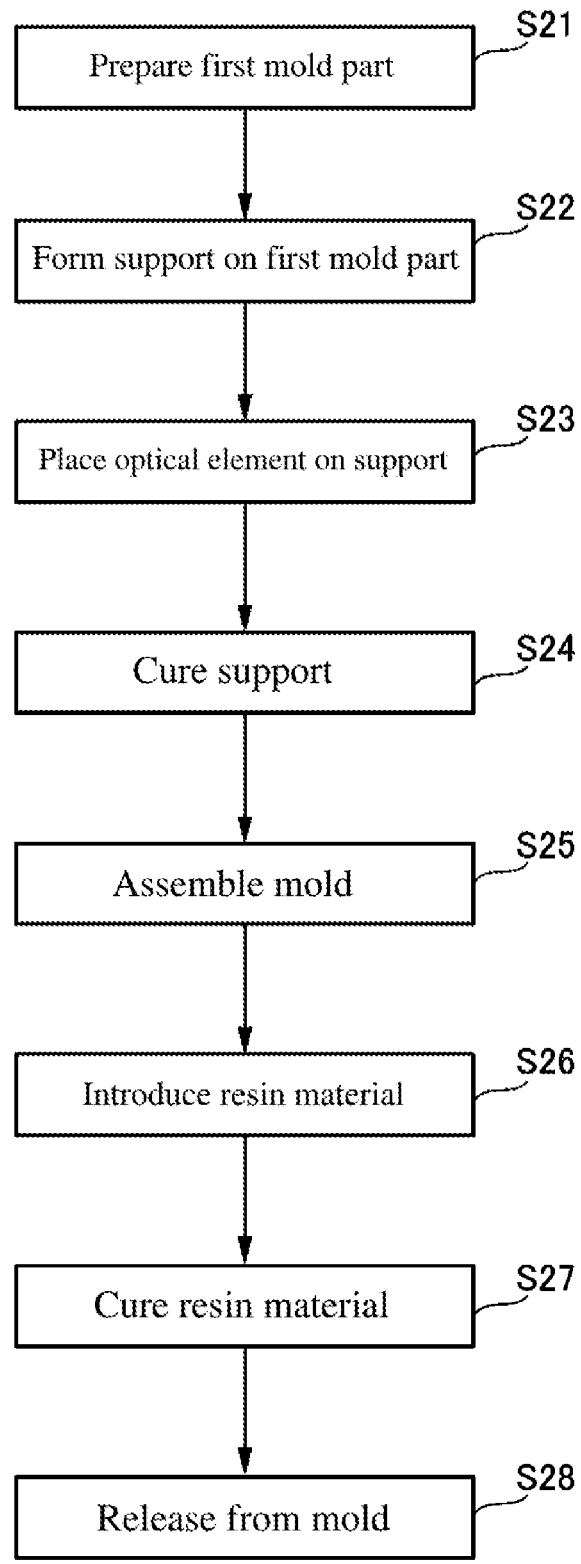
FIG. 11 is a flowchart illustrating steps of the second spectacle lens production method according to the present disclosure.

As shown in FIGS. 9 and 10, the spectacle lens 1 includes a spectacle lens main body 202. The spectacle lens main body 202 is made of a thermosetting resin, and includes a convex object-side face 204 and a concave eyeball-side face 206.

In the spectacle lens main body 202, a strip-like diffraction grating 208 that is an optical element is embedded in the spectacle lens main body 202. As shown in FIG. 9, the diffraction grating 208 is arranged at a position offset from the center of the spectacle lens main body 202 and extends in the radial direction in a plan view. Moreover, as shown in FIG. 2, the diffraction grating 8 as viewed in a cross-section is arranged so as not to be exposed to the outside from the object-side face (outer face) 204 and the eyeball-side face (inner face) 206 of the spectacle lens main body 202, that is, so as to be completely surrounded by the resin for forming the spectacle lens main body 202.

Next, a production method of the spectacle lens 201 will be described.

Figure 12:
FIG. 12 is a schematic view illustrating the spectacle lens production method shown in FIG. 11.

First, a first mold part 220 that is used to produce the spectacle lens 201 is prepared (S21). The first mold part 220 is made of a material such as glass as in the case of known mold parts that are used to produce plastic spectacle lenses, and includes a concave molding face 222 for molding the convex object-side face 204 of the spectacle lens 201 as shown in FIG. 12.

Figure 13:
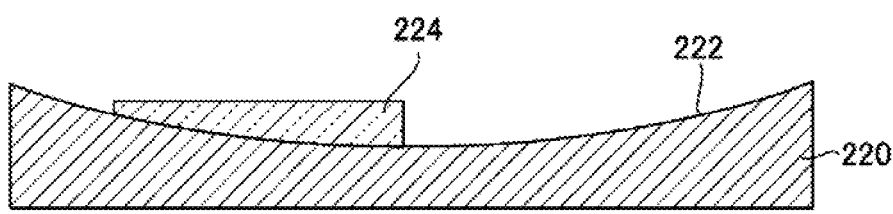
FIG. 13 is a schematic view illustrating the spectacle lens production method shown in FIG. 11.

Next, as shown in FIG. 13, a support 224 on which the diffraction grating (optical element) 208 is to be placed is arranged at a predetermined position on the concave molding face 222 of the first mold part 220 (S22). According to the spectacle lens production method of this embodiment, the support 224 is made of the same type of thermosetting resin as the thermosetting resin for forming the spectacle lens main body 202.

Accordingly, in this step, a resin material (monomer) that is a resin for forming the spectacle lens main body 202 is arranged substantially in the shape of cuboid with a flat top portion on a molding face 222 of the first mold part 220, so that the support 224 is formed.

Figure 14:
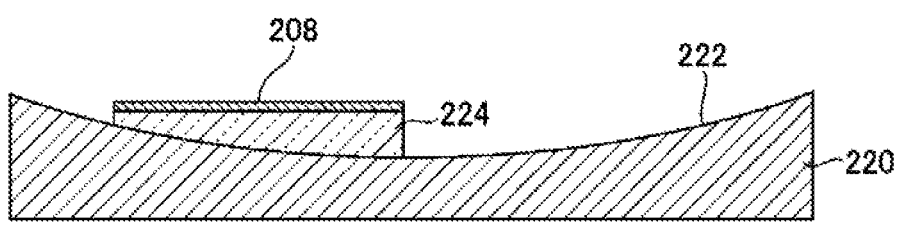
FIG. 14 is a schematic view illustrating the spectacle lens production method shown in FIG. 11.

Next, as shown in FIG. 14, the diffraction grating 208 that is an optical element is placed on the top portion of the support 224 (S23). As a result, the diffraction grating 208 is held in a state of being separate from the molding face 222 of the first mold part 220. According to the spectacle lens production method of this embodiment, the diffraction grating 208 is placed on the support 224 in a state in which the resin for forming the support 224 has not been cured.

Next, the resin for forming the support 224 is cured (S24). The resin is cured by being left at room temperature, or through heating or the like.

Figure 15:
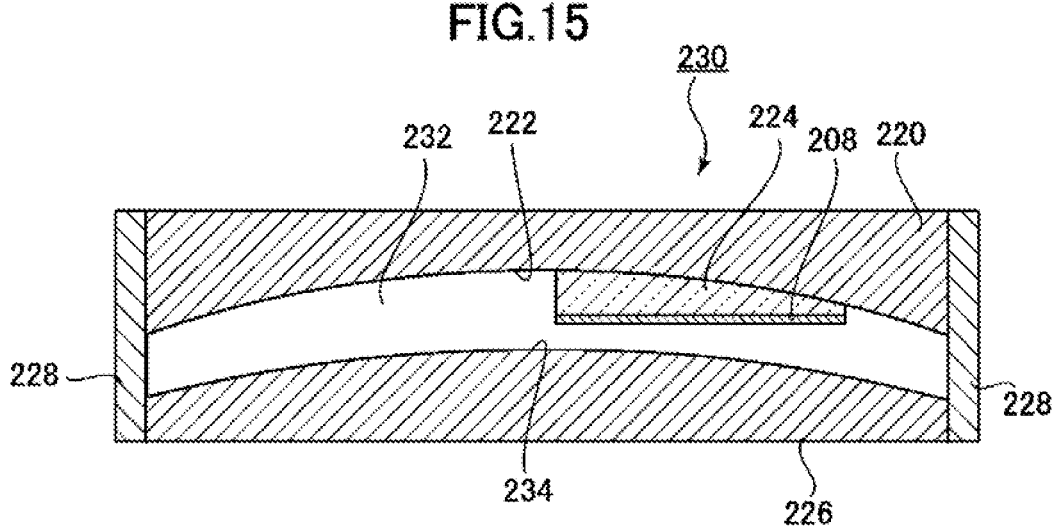
FIG. 15 is a schematic view illustrating the spectacle lens production method shown in FIG. 11.

Moreover, as shown in FIG. 15, the first mold part 220 in which the support 224 with the diffraction grating 208 placed thereon is arranged on the molding face 222 is combined with other mold parts 226, 228, and the like, so that a mold 230 is assembled, and a cavity 232 inside the mold 230 is closed (S25). The diffraction grating 208 placed on the top portion of the support 224 on the molding face 222 of the first mold part 220 is located at a position separate also from a molding face 234 of the mold part 226 and the like.

Figure 16:
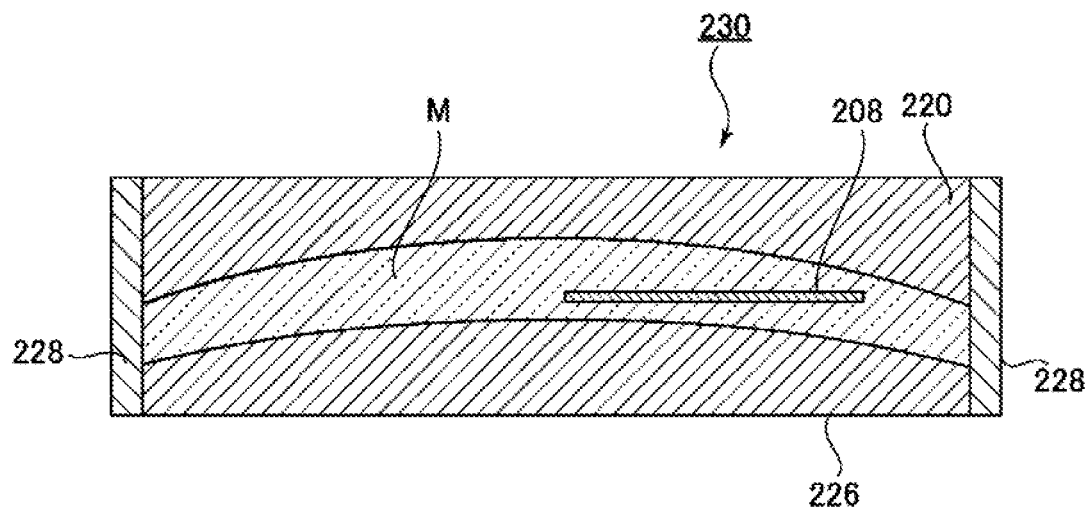
FIG. 16 is a schematic view illustrating the spectacle lens production method shown in FIG. 11.

Next, as shown in FIG. 16, the cavity 232 is filled with a resin material (raw material monomer) M that is a resin for forming the spectacle lens main body 202 (S26). The diffraction grating 208 is separate from the inner faces of the cavity 232 such as the molding face 222 of the first mold part 220 and the molding face 234 of the mold part 226 inside the cavity 232, and thus the diffraction grating 208 is surrounded by the filled resin material M, that is, is not exposed to the outside from the resin material M.

Moreover, the resin material M introduced into the cavity 232 and forming the spectacle lens main body 202 is cured in the cavity 232 through heating to a predetermined temperature (S27). As a result, a spectacle lens in which the diffraction grating 208 that is an optical element is surrounded by a resin in the spectacle lens main body 202 is formed inside the cavity 232.

Lastly, the mold 230 is disassembled, and the spectacle lens 201 molded inside the cavity 232 is detached, that is, released from the mold 230 (S28).

The present disclosure is not limited to the foregoing embodiments, and various changes and modifications are possible within the technical scope of the claims.

In the foregoing embodiment, thermosetting resins were used as the resins, but a configuration may also be employed in which thermoplastic resins are used.

In the foregoing embodiment, a spectacle lens production method was described in which a diffraction grating was used as an optical element that is embedded, but the present disclosure can also be applied to spectacle lens production methods in which other optical elements are embedded.

Figure 17:
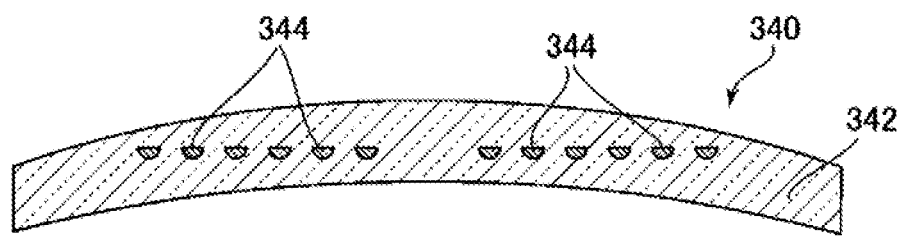
FIG. 17 is a schematic cross-sectional view of a spectacle lens produced using a spectacle lens production method according to a third embodiment of the present disclosure.

For example, the present disclosure can also be applied to a method for producing a spectacle lens as shown in FIG. 17 in which a small beads 344 made of a resin with a refractive index different from that of the resin for forming a base portion 342, that is, the main body of a spectacle lens 340 are embedded in the base portion 342 (i.e., arranged without being exposed to the outside). In this spectacle lens, the base portion has a refractive power that corrects short-sightedness, and the small beads have a refractive power higher than that of the base portion. Since the small beads have a refractive power higher than that of the base portion, the focus can be shifted to suppress the progress of refractive errors such as short-sightedness of a person who is wearing the glasses.

Figure 18:
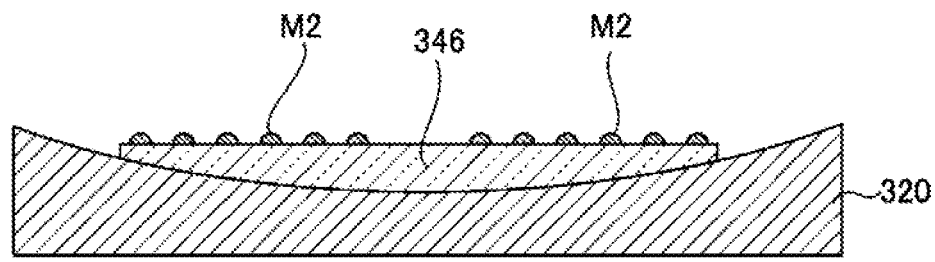
FIG. 18 is a schematic view illustrating a method for producing the spectacle lens shown in FIG. 17.

When producing the spectacle lens 340 with this configuration, as shown in FIG. 18, a support 346 with a predetermined size and shape made of the same resin material as the thermosetting resin for forming the main body (base portion) 342 of the spectacle lens is arranged at a predetermined position on a molding face 322 of a first mold part 320.

Next, a resin material M2 that is a thermosetting resin with a refractive index different from that of the thermosetting resin for forming the base portion 342 of the spectacle lens is dropped using a dispenser or the like at a plurality of predetermined positions on the support 346. The resin material M2 has a hemispherical shape due to surface tension, and is cured to form small beads 344.

Figure 19:
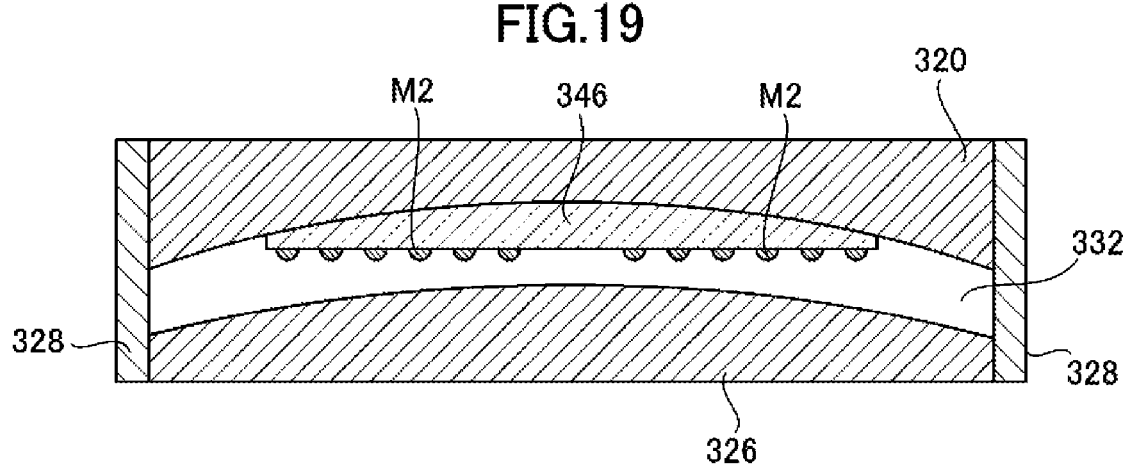
FIG. 19 is a schematic view illustrating the method for producing the spectacle lens shown in FIG. 17.

Moreover, after the resin material M2 is cured, as shown in FIG. 19, in a similar way to those of the production methods according to the foregoing embodiments, the first mold part 320 is combined with other mold parts 326, 328, and the like, so that a mold 330 is assembled, and a cavity 332 inside the mold 330 is closed.

Moreover, in a way similar to that of S26 in the foregoing embodiment, the cavity 332 is filled with a resin material that is a thermosetting resin for forming the base portion 342 of the spectacle lens, so that a spectacle lens 340 is obtained in which the small beads 344 are embedded, that is, are arranged inside the base portion 242 without being exposed to the outside.

It is preferable that the hemispherical small beads 344 are set to each have a diameter r of approximately 0.8 to 2.0 mm and a thickness of approximately 0.1 to 1.15 mm. Furthermore, it is preferable that the intervals between adjacent small beads 344 are each set to be approximately equal to the radius (r/2) of the small beads 244. Moreover, it is preferable that the refractive index of the small beads 244 is larger than the refractive power of the base portion 42 by 2.00 to 5.00 diopters.

The base portion 342 of the spectacle lens 340 is made of, for example, a thiourethane-based resin (thermosetting resin) with a refractive index of approximately 1.590 or 1.578, and the small beads 344 are made of, for example, a thiourethane-based resin (thermosetting resin) with a refractive index of approximately 1.5955 and having excellent adhesion to the resin for forming the base portion 342 of the spectacle lens 340. The resin for forming the base portion 342 of the spectacle lens 340 and the resin for forming the small beads 344 may also be other types of thermosetting resins or thermoplastic resins selected as appropriate in consideration of refractive indices.

Furthermore, it is known that a spectacle lens as shown in FIG. 17 in which a plurality of small beads 344 made of a resin with a refractive index different from that of the resin for forming the base portion 342 of the spectacle lens are embedded can shift the focus, thereby suppressing the progress of refractive errors such as short-sightedness of a person who is wearing the glasses.

Figure 20:
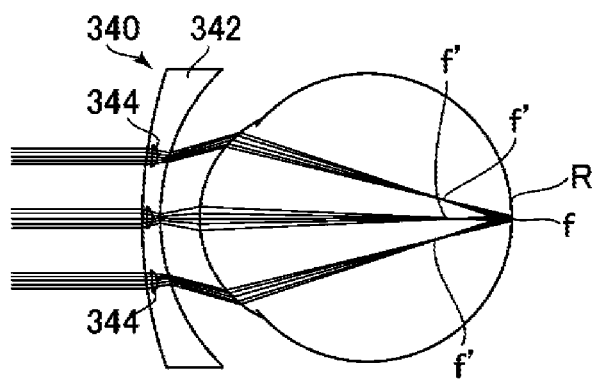
FIG. 20 is a schematic view illustrating actions of the spectacle lens shown in FIG. 17.

FIG. 20 is a view illustrating light that passes through the spectacle lens 340 and is incident on an eyeball, specifically, trajectories of light that passes through the base portion 342 and trajectories of light that passes through the small beads 344.

As shown in FIG. 20, light that passes through the base portion 342 of the spectacle lens 340 having a refractive power that corrects short-sightedness is focused on a position f on the retina R, and light that passes through the small beads 344 having a refractive power larger than that of the base portion 342 is focused on positions f' that are in front of the retina R. That is to say, light that passes through the spectacle lens 340 forms an image on the retina R, and light that passes through the plurality of small beads 344 forms a plurality of images in front of (on the lens side of) the retina R. As a result, while a person who is wearing the glasses using the spectacle lens 340 is viewing an image of an object, the progress of his or her short-sightedness is suppressed.

In the foregoing embodiments, thermosetting resins were used as the resins, but a configuration may also be employed in which thermoplastic resins are used.

LIST OF REFERENCE NUMERALS

1 Spectacle lens
2 Spectacle lens main body (base portion)
4 Object-side face of spectacle lens main body (base portion)
6 Eyeball-side face of spectacle lens main body (base portion)
8 Hard coat layer
10 Anti-reflection coating (AR coating)
12 Small bead
12a Flat portion of small bead
20 First mold part
22 Molding face of first mold part
24 Another mold part
26 Mold
28 Cavity
M1 Raw material monomer (resin material) for forming spectacle lens main body
M2 Raw material monomer (resin material) for forming small bead
201 Spectacle lens
202 Spectacle lens main body
204 Object-side face of spectacle lens main body
206 Eyeball-side face of spectacle lens main body
208 Optical element
220 First mold part
222 Molding face of first mold part
224 Support
226 Another mold part
230 Mold
232 Cavity

The invention claimed is:

1. A spectacle lens production method for producing a spectacle lens including a base portion that is made of a resin material and the base portion includes a convex object-side face and a concave eyeball-side face, and the spectacle lens includes an optical element that is made of a material different from the material for forming the base portion and is embedded in the base portion, the method comprising:
providing the optical element so as to be arranged in a cavity of a mold including a first mold part and a second mold part that can be opened and closed;
wherein the optical element is a plurality of small beads that are each made of a resin different from the resin for forming the base portion, and that are embedded in the base portion in a state of being partially exposed from the base portion, and
the providing the optical element includes arranging resin material of the resin for forming the small beads by dropping to predetermined positions on a surface of the first mold part of the mold and first curing the resin material for forming the small beads;
after providing the optical element, introducing a resin material for forming the base portion of the spectacle lens into the cavity of the mold;
obtaining the spectacle lens by second curing the resin material that is a resin for forming the base portion;
disassembling the mold; and
detaching the spectacle lens from the mold.

2. The spectacle lens production method according to claim 1,
wherein each of the small beads has a refractive power larger than that of the base portion.

3. The spectacle lens production method according to claim 1,
wherein the small beads each have a diameter r of 0.8 to 2.0 mm.

4. The spectacle lens production method according to claim 1,
wherein at least one of the small beads are made of a thiourethane material.

5. The spectacle lens production method according to claim 1,
wherein the refractive power of at least one of the small beads is larger than the refractive power of the base portion by 2.00 to 5.00 diopters.

6. The spectacle lens production method according to claim 1,
wherein intervals between adjacent small beads are each set to a distance that is equal to a radius (r/2) of the small beads.

7. The spectacle lens production method according to claim 1,
wherein the base portion has a refractive power that corrects short-sightedness.

8. The spectacle lens production method according to claim 1,
wherein at least one of the small beads are hemispherical.

9. The spectacle lens production method according to claim 1,
wherein the resin for forming the base portion is a thermosetting resin.

10. The spectacle lens production method according to claim 1,
wherein at least one of the small beads are embedded in the base portion and have a surface being flush with the convex object-side face of the base portion and at least one of the small beads are exposed to the outside of the base portion from the convex object-side face.

11. The spectacle lens production method according to claim 1,
wherein the spectacle lens has a hard coat layer on the object-side face.

\* \* \* \* \*